United States Patent
Ericsson

(10) Patent No.: US 6,556,842 B1
(45) Date of Patent: Apr. 29, 2003

(54) METHOD AND APPARATUS IN A TELECOMMUNICATIONS NETWORK

(75) Inventor: Ingela Ericsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/503,701

(22) Filed: Feb. 14, 2000

(30) Foreign Application Priority Data

Feb. 18, 1999 (SE) ............................................... 9900563

(51) Int. Cl.[7] ................................................. H04B 1/38
(52) U.S. Cl. ...................... 455/558; 455/432; 455/433; 455/435; 455/458; 455/556; 455/557
(58) Field of Search ................................ 455/432, 433, 455/435, 458, 556, 557, 558

(56) References Cited

U.S. PATENT DOCUMENTS

| | | | |
|---|---|---|---|
| 5,819,180 A | * 10/1998 | Alperovich et al. | ........ 455/465 |
| 5,953,667 A | * 9/1999 | Kauppi | ........................ 455/440 |
| 6,101,388 A | * 8/2000 | Keshavarch | ................. 455/435 |
| 2002/0032032 A1 | * 3/2002 | Haumont et al. | ............ 455/436 |

* cited by examiner

*Primary Examiner*—William Trost
*Assistant Examiner*—Danh C Le

(57) ABSTRACT

A method in a cellular telecommunications network in which at least one Localized Service Area, LSA, has been specified, each LSA comprising one or more cells, comprises the steps of determining if information regarding an LSA has been changed, identifying at least one subscriber belonging to this LSA, and transmitting change information to said at least one subscriber belonging to the LSA to upgrade information on a SIM card held by this subscriber. Preferably an indicator is set to indicate if the subscriber belonging to the LSA needs the update information for the type of change made and transmitting update information only if there is such a need. For example, the list of cells belonging to an LSA only needs to be updated if cell information is stored on the SIM card. A node for carrying out the method is also disclosed.

6 Claims, 2 Drawing Sheets

METHOD AND APPARATUS IN A TELECOMMUNICATIONS NETWORK

This application claims priority under 35 U.S.C. §§119 and/or 365 to 9900563-9 filed in Sweden on Feb. 18, 1999; the entire content of which is hereby incorporated by reference.

BACKGROUND

The present invention relates to communication in a cellular network and in particular a cellular network in which Localized Service Areas (LSAs) have been specified.

A cellular network operator can define one or more LSAs in the network, each LSA consisting of one or more cells.

The European Telecommunications Standards Institute (ETSI) is currently developing a new function called Support of LSA (SoLSA), which will enable the use of different tariffs, different access rights or services depending on the geographical location. The geographical location is based on physical radio resources. Typically, each subscriber will have a home and or office LSA in which the tariff is lower, or certain services are available which are not available to him in other cells.

The information about each subscriber's allowed LSA or LSAs, is stored in the Subscriber Identity Module (SIM) card, and may be updated. When a subscriber is roaming in the network, an identity signal is received from each cell from which it is currently able to receive signals, and, if one of these signals comes from the allowed LSA, the subscriber camps on this cell. In some cases information about both the allowed LSA and each cell belonging to it is provided. For example, when a cell belongs to more than one LSA, it may be feasible to transmit only the cell identity instead of all possible LSA identities, which may reduce the paging capacity for the operator.

WO 98/30056 discloses a method and means for carrying out the method, by which a subscriber is informed about certain cells in a network. These cells may be defined as preferred cells, e.g. with call charges below the normal tariff. However, the disclosed method does not take into consideration possible occurrence of cell identifies and LSAs, both stored on a SIM-card. As a consequence of this, each subscriber must be provided with a required list of cell identities, whereby more network capacity is occupied than if only the changes in LSAs are transmitted. Moreover, no check can be made of whether changes have been made in the LSA arrangement, e.g. due to current cell planning.

Each operator can choose if only LSA identity or both cell identity and LSA identity is to be stored on the subscribers' SIM cards. In the case where both cell identity and LSA identity are stored a problem may arise when cells are added to, or removed from an LSA. The information on the SIM card will then be incorrect, and must be updated. Two ways of updating the information have been discussed: The information can be transmitted through the air interface from a Service Management Centre (SMC) in the network using the Short Message Service (SMS) or Unstructured Supplementary Subscriber Data (USSD) service available in the network, or the subscriber's SIM card can be returned to the operator and updated or exchanged.

Updating the SIM card from the SMC requires manual work to identify the SIM cards that are to be updated and to send out the SMS or USSD messages and the manual establishment of a connection to each mobile terminal that is to be updated. Returning the SIM card to the operator by post is time consuming and requires even more manual work. An application of SMS is the SIM data download feature, which is used to update SIM cards.

It is an object of the present invention to provide a simplified way of ensuring that each subscriber always has the correct information regarding his/her allowed LSA.

This object is achieved according to the invention by a method in a cellular telecommunications network in which at least one Localized Service Area, LSA, has been specified, each LSA comprising one or more cells, said method comprising the following steps:

determining if information regarding an LSA has been changed;

identifying at least one subscriber belonging to this LSA;

transmitting change information to said at least one subscriber belonging to the LSA to update information on a SIM card held by this subscriber.

The object is also achieved according to the invention by a node in a cellular telecommunications network said network comprising at least one Localized Service Area, LSA, has been specified, each LSA comprising one or more cells, said node being characterized in that it comprises first and second storage means comprising information about the relationship between at least one LSA in the network and the cells belonging to it;

third storage means comprising information about the subscribers belonging to said at least one LSA;

control logic for determining when information regarding an LSA has been changed;

function means for effecting the transmission of change information to at least one subscriber in dependence of the contents of said first, second and third storage means.

The method and node according to the invention ensure that the LSA and cell identity information found on each subscriber's SIM card is always correct and updated, with no manual work required.

According to a preferred embodiment the method further comprises the step of determining if the subscriber belonging to the LSA needs the update information for the type of change made and transmitting update information only if there is such a need.

This may be determined by means of an indicator set for each LSA, showing if cell identity information is stored on the SIM card. The node in this case comprises control logic for determining, on the basis of the indicator, if the change information needs to be transmitted to subscribers in this LSA.

This reduces the amount of information that has to be transmitted through the air interface, since in some cases only SIM cards having both cell identity and LSA identity information need to be updated.

Preferably, the node also comprises function means for effecting the transmission of update information to a home location register in the network.

In a preferred embodiment said node is a base station controller and the storage means are implemented in or in connection to the base station controller. This is feasible because the base station controller can easily establish connections both to mobile terminals and to the HLR.

BRIEF DESCRIPTION OF THE DRAWINGS

The apparatus and method according to the invention will be described in more detail in the following, with reference to the appended drawings, in which.

DETAILED DESCRIPTION

Figure 1:
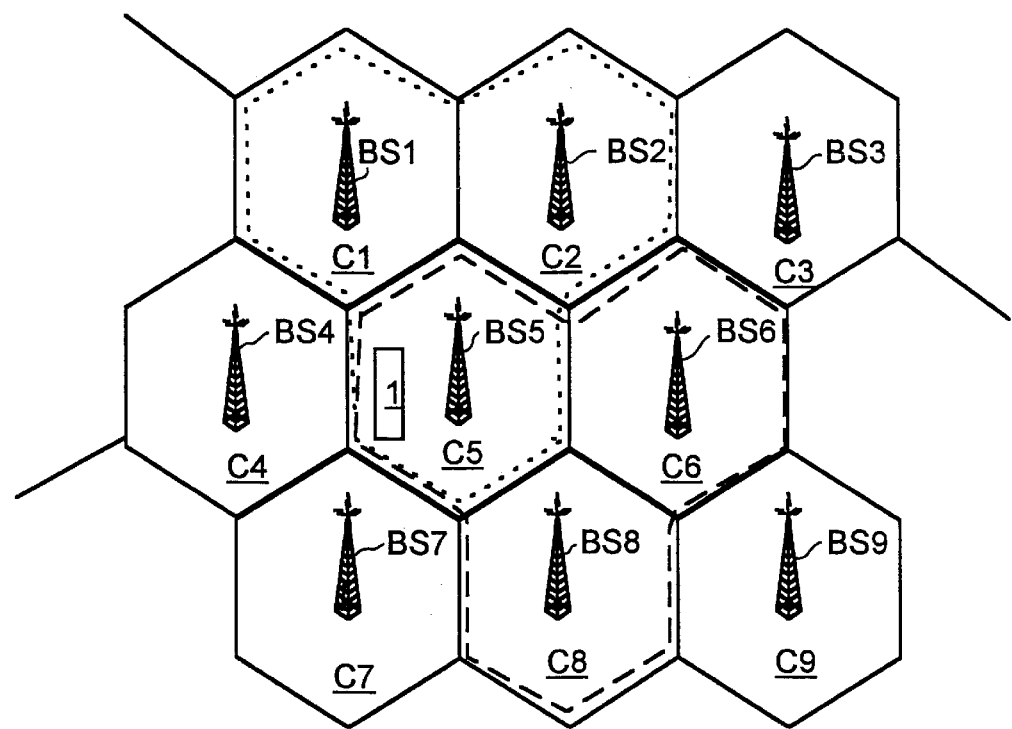
FIG. 1 is an overall view of a part of a cellular network.

FIG. 1 shows a part of a cellular network comprising a number of hexagonal cells C1–C9. Three cells, C5, C6 and C8 have been defined as belonging to a LSA, LSA1, the border of which is drawn with a dashed line. The cells C1, C2 and C5 belong to a second LSA, LSA2, the border of which is drawn with a dotted line. Thus, cell C5 belongs both to LSA1 and to LSA2. Each cell comprises a base station BS1–BS9. Somewhere in the network there is a mobile terminal 1. The mobile terminal 1 will receive signals from different base stations BS1–BS9 depending on its location. The allowed LSA of the mobile terminal is LSA1, consisting of C5, C6 and C8. The information about the allowed LSA is stored on the SIM card in the mobile terminal 1, and in the Home Location Register (HLR) in the network, as will be discussed in connection with FIG. 2.

The base stations transmit signals to identify the LSA and/or cell to which they belong. In the present configuration, Cells C6 and C8 will transmit the information "LSA1", cells C1 and C2 will transmit the information "LSA2" and cell C5 will transmit the information "LSA1" and "LSA2". If a cell belongs to several LSAs, the LSA identity of each LSA must be transmitted. To reduce the amount of information that has to be transmitted, the base station BS5 can instead transmit only the cell identity, provided the cell identity of each cell in the allowed LSA is also stored on the SIM card. The mobile terminal 1 can then recognize the cell identity "C5" as belonging to its allowed LSA, LSA1.

Figure 2:
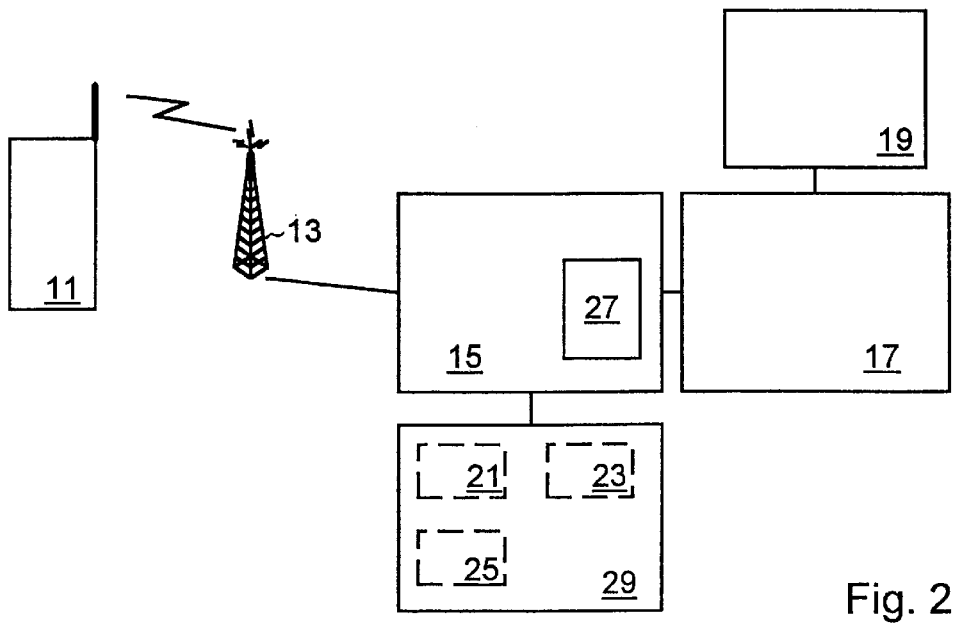
FIG. 2 is a block diagram of a cellular network.

FIG. 2 is a block diagram of part of a cellular telecommunications network. Again, a mobile terminal 11 receives signals from one or more base stations 13, of which only one is shown in FIG. 2. The base station 13 is connected to a base station Controller (BSC) 15, which controls the function of the base station 13. The base station controller 15 is in turn connected to a cellular exchange (Mobile Services Switching Centre—MSC) 17 performing the switching functions in the network. Normally, several base stations and base station controllers are connected to one MSC. The MSC 17 is connected to the Home Location Register (HLR) 19, in which general information about each subscriber is stored, including information about the allowed LSA.

When the LSA identity or the identities of the cells belonging to the LSA is changed, or an LSA is removed, the information on the SIM card and the HLR entry for each affected subscriber has to be changed. According to the invention this is done from a node in the network, such as the base station controller, from which a signalling connection to each mobile terminal, and to the HLR, can be established automatically.

To be able to do this the BSC must include, or have access to:

A first database 21 listing the cells in each LSA.

A second database 23 listing the LSAs belonging to each cell.

A third database 25 listing the subscribers belonging to each LSA

Control logic 27 to determine when new update information is to be transmitted.

In FIG. 2 the databases 21, 23 are shown in a support unit 29 connected to the BSC 15 and the control logic 27 is shown in the BSC 15. Of course each one of the units 21, 23, 25, 27 could be implemented in the BSC 15 itself, in the support unit 29 or in an existing node in the network, such as the MSC 17.

The node responsible for deciding when to update must also be able to determine when information regarding a particular LSA has been changed. Preferably this is achieved in that the LSA information is stored in the BSC and updates are made directly in the BSC. In this way, the BSC always has information about which LSAs have been updated and in which way. Alternatively, the information may be stored in any other node in the network and transferred to the BSC when necessary.

Although according to a preferred embodiment of the invention the BSC 15 is responsible for deciding when an update is to be made and to initiate the update, the decision to update could be made in another node in the network, such as the MSC 17 which would then instruct the BSC 15 to transmit the update information to the mobile terminals 11. The MSC 17 could then transmit the information directly to the HLR 19.

As explained above, cell identities are not used in all LSAs. Most changes, for example, a change of cells included in an LSA, will not lead to a need for update in SIM cards that do not have the cell identity information stored on them, since the LSA identity will still be the same. To reduce the amount of information that has to be transmitted, according to a preferred embodiment of the invention an indicator may be set for each LSA to indicate if cell identities are stored on the SIM cards or not. If not, the information does not have to be transmitted to the subscribers belonging to this LSA. If the indicator is set for an LSA, that means that the update information has to be transmitted to the subscribers belonging to this LSA.

The update information may be transmitted in any way known in the art. Suitable methods are an SMS message to the HLR and a SIM data download message to the SIM card. These methods are well known in the art and will not be discussed in detail here.

Figure 3:
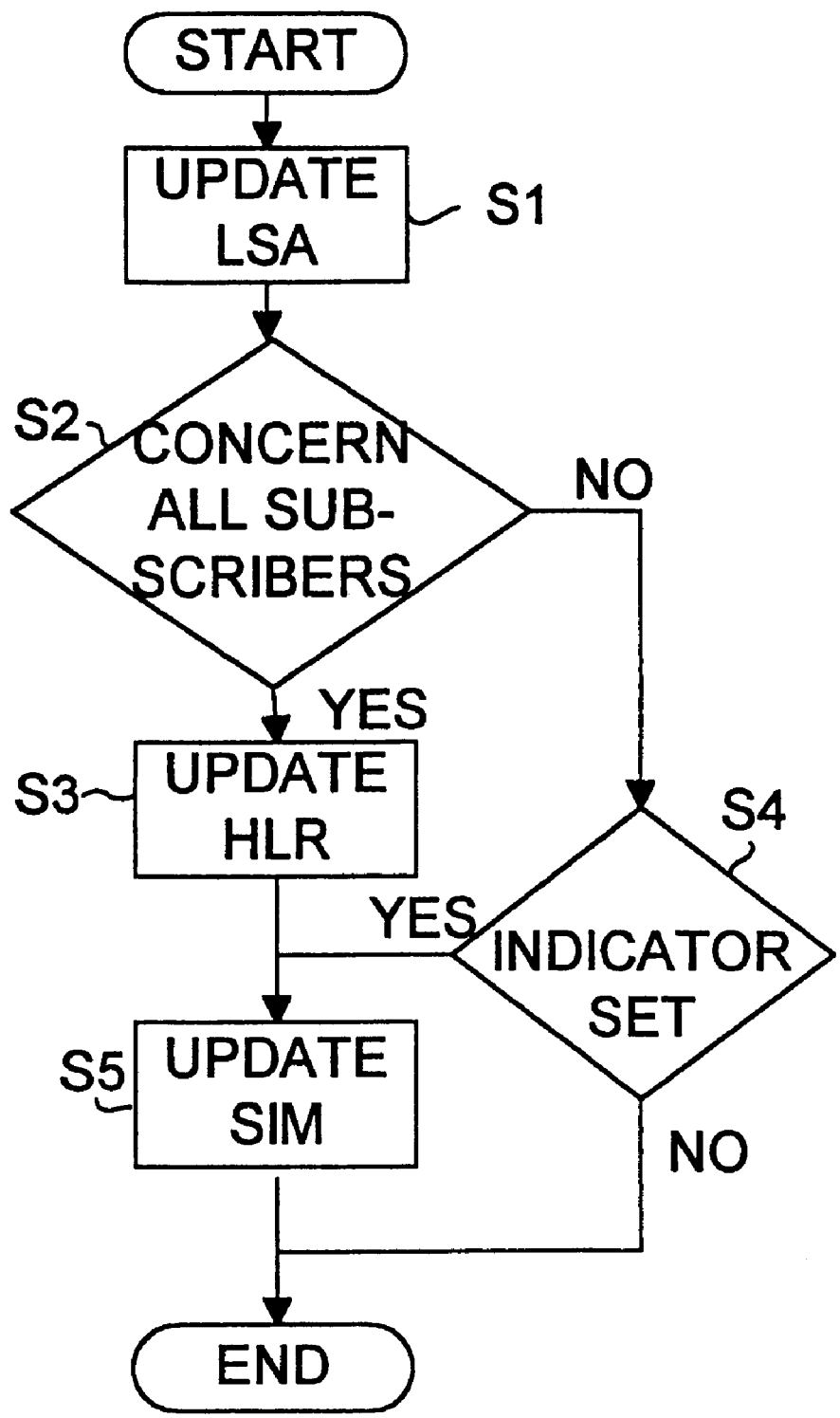
FIG. 3 is a flow chart of the method according to the invention.

FIG. 3 is a flow chart of the method according to the invention.

Step S1: Information regarding an LSA is changed.

Step S2: Does this information concern all subscribers regardless of whether cell information is stored on the SIM cards or not? If yes, go to step S3; if no, go to step S4.

Step S3: Update the information in the HLR regarding the subscribers belonging to this LSA.

Step S4: Is the broadcast indicator set for this LSA? If yes, go to step S5; if no, end of procedure.

Step S5: Transmit update information to the subscribers belonging to this LSA. End of procedure.

In step 1, different types of changes may be made. For example, a cell may be split. According to the invention the new cell should inherit the LSA parameters of the old cell. A cell may be removed from the LSA, or a new cell may be added to the LSA. In each of these cases, SIM cards holding information about the cells of the allowed LSA must be updated. Alternatively, general LSA parameters, such as the LSA identity, may be set, which require an update of all SIM cards belonging to the LSA regardless of whether or not they have cell information stored on them.

As mentioned above, decision steps S2 and S4 are optional since the broadcast indicator does not have to be used. Without the broadcast indicator update information will always be transmitted to all subscribers belonging to an LSA that has been updated, which will lead to more traffic in the network. If the updates are made at times when the traffic is low this may not be a big problem.

In steps S3 and S5 the update information may be transmitted in any way known in the art. For example, the SMS or USSD function may be used. A particular application of the SMS function, the SIM data download function, has been developed to enable information updates on the SIM card.

What is claimed is:

1. A method in a cellular telecommunications network in which at least one Local Service Area, LSA, has been specified, each LSA comprising one or more cells, said method comprising the following steps:

determining if information regarding an LSA has been changed;

identifying at least one subscriber belonging to the LSA;

utilizing an indicator for determining whether cell identity information is stored on a SIM card corresponding to said at least one subscriber; and transmitting change information to said at least one subscriber belonging to the LSA to update information on the SIM card held by this subscriber according to the indicator.

2. A method according to claim 1, further comprising the step of determining if the subscriber belonging to the LSA needs the update information for the type of change made and transmitting update information only if there is such a need.

3. A node in a cellular telecommunications network, said network comprising at least one Localized Service Area, LSA, that has been specified, each LSA comprising one or more cells, the node comprising:

first and second storage means comprising information about the relationship between at least one LSA in the network and the cells within the at least one LSA, third storage means comprising information about the subscribers belonging to said at least one LSA;

control logic for determining when information regarding an LSA has been changed and for determining, according to an indicator set for each LSA, if the change information needs to be transmitted to subscribers in this LSA; and function means for effecting the transmission of change information to at least one subscriber in dependence of the contents of said first, second, and third storage means.

4. A node according to claim 3, further comprising function means for effecting the transmission of update information to a home location register in the network.

5. A node according to claim 3, comprising a base station controller.

6. A cellular telecommunications network in which at least one Localized Service Area has been specified, each Localized Service Area comprising one or more cells, comprising at least one node according to claim 3.

* * * * *